No. 48,223.   PATENTED JUNE 13, 1865.
H. TILDEN.
FLOUR SIFTER.

Witnesses.
J. Dennis Jr.
Edw. F. Brown

Inventor.
Horace Tilden

UNITED STATES PATENT OFFICE.

HOWARD TILDEN, OF BOSTON, MASSACHUSETTS.

IMPROVED FLOUR-SIFTER.

Specification forming part of Letters Patent No. 48,223, dated June 13, 1865.

*To all whom it may concern:*

Be it known that I, HOWARD TILDEN, of Boston, Suffolk county, and State of Massachusetts, late of Philadelphia, in the State of Pennsylvania, have invented a new, useful, and Improved Sifter for Flour, Apple or Pumpkin Sauce, &c.; and I do hereby declare that the following description and accompanying drawings are sufficient to enable any person skilled in the art or science to which it most nearly appertains to make and use my said invention or improvements without further invention or experiment.

The nature of my invention and improvement in sifters for flour, sauce, &c., consists in the use of rollers to roll against the screen, in combination with scrapers to pass over the screen after the rollers.

Figure 1:
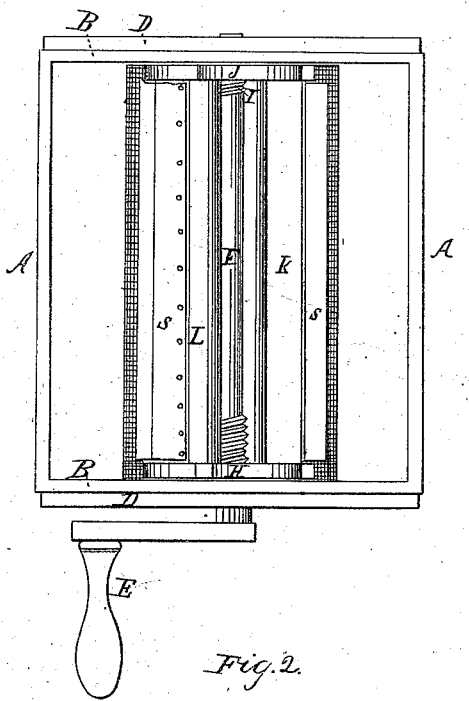
Figure 2:
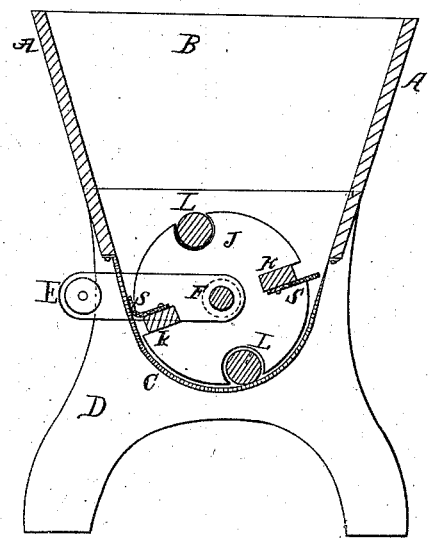

In the accompanying drawings, Figure 1 is a plan or top view of my improved sifter. Fig. 2 is a sectional elevation of the same, cut perpendicularly across the center.

In these drawings, A A are the sides, and B B the ends, of the box or hopper, made of wood, tin, or other suitable material, in the form shown, or in such other form as will answer the purpose. The lower edges of the ends B B are made in the arc of a circle, as shown in Fig. 2, to give form to the woven-wire screen C, which is fastened to them and to the lower edges of the sides A A. I make some pieces D D in the form shown in Fig. 2, and fasten them to the ends B B to support the box and screen a proper distance from the bottom of the tub or vessel which is to receive the flour or sauce sifted. The ends B are perforated for the journals of the shaft F to turn in, which shaft is provided with a crank, E, to turn it and operate the machine. The journal at the crank end of the shaft F is made larger than the other part, and has a screw-thread, G, cut on it to fit a female screw in the disk H, and a thread, I, for the disk J, the diameter of the shaft being less at I than at G, and still smaller for the journal at the end opposite the crank, to allow the female screw in the disk to pass over it freely when the shaft is removed to take out the disks and parts attached to clean them. The disks H and J are connected by the bars K K, which are firmly fastened to the disks and provided with flexible scrapers S, of india rubber, leather, or other material, which sweep the material to be sifted over the screen C, through which it is sifted. Alternately between the bars K, I arrange some rollers L L, the ends of which rollers are fitted to turn freely in the disks as the rollers roll over the flour and the screen and mash the lumps and press the flour or material being sifted through the screen.

To use the improved sifter, place it on the board or vessel which is to receive the sifted flour and put the flour or material to be sifted into the hopper and turn the crank, when the rollers and scrapers will force the flour through the screen.

Having described my invention, what I claim as my improvement in sifters for flour, sauce, &c., is—

The rollers or their equivalents for mashing the lumps, in combination with the scrapers, substantially as described.

HOWARD TILDEN.

Witnesses:
 J. DENNIS, Jr.,
 EDM. F. BROWN.